(12) United States Patent
Kagan et al.

(10) Patent No.: US 6,850,502 B1
(45) Date of Patent: Feb. 1, 2005

(54) JOIN PROCESS METHOD FOR ADMITTING A NODE TO A WIRELESS MESH NETWORK

(75) Inventors: Yishai Kagan, Sunnyvale, CA (US); Josef Berger, Santa Clara, CA (US); Patrick Worfolk, Campbell, CA (US)

(73) Assignee: Radiant Networks, PLC, Essex (GB)

( * ) Notice: Subject to any disclaimer, the term of this patent is extended or adjusted under 35 U.S.C. 154(b) by 532 days.

(21) Appl. No.: 09/699,582

(22) Filed: Oct. 30, 2000

(51) Int. Cl.[7] ............................................... H04Q 7/00
(52) U.S. Cl. ...................... 370/330; 370/334; 370/338; 370/349; 370/400
(58) Field of Search ................................ 370/310, 321, 370/336, 337, 347, 349, 350, 330, 442, 447, 461, 465, 468, 498, 503, 912, 913; 455/3.01, 500; 435/509, 512; 342/357.06, 357.12

(56) References Cited

U.S. PATENT DOCUMENTS

| | | | |
|---|---|---|---|
| 5,809,431 A | * | 9/1998 | Bustamante et al. ...... 455/562.1 |
| 5,884,181 A | * | 3/1999 | Arnold et al. ............... 455/450 |
| 6,018,659 A | * | 1/2000 | Ayyagari et al. ............ 455/431 |
| 6,049,593 A | * | 4/2000 | Acampora .................. 379/56.2 |
| 6,553,020 B1 | * | 4/2003 | Hughes et al. .............. 370/347 |

FOREIGN PATENT DOCUMENTS

| | | |
|---|---|---|
| EP | 0 999 717 A2 | 12/1998 |
| WO | WO 00/25485 | * 5/2000 |

OTHER PUBLICATIONS

J. Berger et al., copy of PCT Application as filed on Oct. 10, 2000 for PCT App. No. US00/27959, Titled "Spatially Switched Router For Wireless Data Packets", 41 pages.

* cited by examiner

*Primary Examiner*—Frank Duong
(74) *Attorney, Agent, or Firm*—Pillsbury Winthrop LLP

(57) ABSTRACT

A join process is disclosed for a wireless mesh topology network. In the network, nodes have multiple spatial coverage sub-sectors together covering a larger sector angle and a node can establish connection with other nodes located in directions covered by its sub-sectors. The join process adds a joining node to the network and includes having the joining node listen to sub-sectors at a specific receiving frequency for a defined time. Thereafter, the network node changes its sub sectors and its receiving frequencies according to a defined timing and sequence. Active network nodes transmit organized invitation data packets on defined sectors, frequencies and timing, based on relative location and relative angle orientation deduced from sub-sectors already in use for existing internal network communication. This reduces frequency interference in the network and reduces time required for the join process.

13 Claims, 7 Drawing Sheets

JOIN PROCESS METHOD FOR ADMITTING A NODE TO A WIRELESS MESH NETWORK

BACKGROUND

The present invention relates to the field of networking in general and in particular to the field of wireless mesh networks where a spatially dispersed wireless node is admitted to the mesh network using an automatic join process method that incorporates time, frequency and space scheduling and synchronization of the inviting mesh network nodes.

Wireless networks are commonly designed by incorporating multiple Point to Point (PP) radio links connecting to each other, thus using fixed radio link connections to network the desired locations. Another commonly used network architecture employs a cell network topology such as Point to Multi Point (PMP) topology or a cellular based topology. Each node in such a network includes a radio and associated antenna. In the PMP topology, the network is controlled from a centralized location, such as a base station.

In a network including multiple independent point to point links, the addition of a new network node to the network is done manually by adding a new point to point wireless link. This is referred to as an admittance or admission process, in which the new network node is added to the network and initiates reliable radio communication with other components in the network. In a conventional admittance process, the radio link antennas are manually or mechanically aligned towards each other, until high quality reception is achieved. In the case of a PMP network, a base station is generally located near the center of the network and a new subscriber radio joins the network by communicating with the base station or multiple known base stations.

Two generic cases for admitting a new node to a network exist. In the first case, the subscriber has an omni-directional antenna. An example is a handset in a mobile communication system. In this case, the subscriber receives an invitation on a specific control channel and is invited by a base station covering his cell location. In the second case, the subscriber radio incorporates a directional antenna. Examples include satellite TV broadcast networks or PMP wireless access networks. A mechanical alignment process is done at the subscriber side alone whereby the subscriber antenna is aligned towards the base station to achieve optimum radio frequency (RF) signal reception. In the above-described previous networks, a new network node joins the network using mechanical alignment to achieve optimum reception.

The point to multi point alignment process is described in FIG. 1. FIG. 1 illustrates a portion of a prior art point to multi point wireless network 10. The network 10 includes a base station 11 and transceiver nodes 12, 19. The base station 11 has one or more antennas and associated transceivers for communicating in four 90 degrees sectors 13, 14, 15, 16 respectively, defined by axes 17a and 17b. The sectors 13, 14, 15, 16 are fixed in relation to the base station 11. The transceivers are assigned fixed frequencies for communicating in their associated sectors.

Each transceiver node 12, 19 corresponds to a subscriber radio. Transceiver node 12 includes an antenna having a single lobe or beam 18. The beam 18 is aligned mechanically by steering the antenna at the transceiver node 12 horizontally and vertically towards the location of the base station 11 until the beam 18 of the transceiver node 12 receives maximum signal strength from the transceiver associated with sector 13. The base station transceiver associated with sector 13 transmits data and invitation signals at its fixed frequency. Transceiver node 12 receives that frequency via its lobe or beam 18 and a signal strength indicator identifies the direction maximum received signal strength. This enables a human installer or motorized antenna driver to adjust the angular position of the antenna for maximum reception.

Alignment of transceiver node 19 is described in FIG. 1 as well. By rotating the transceiver antenna towards the base station 11, correct alignment is achieved with the base station transceiver and antenna associated with sector 14. Again, alignment is mechanical, by manually orienting the antenna beam or lobe to optimize signal reception.

In the example of point to multi-point communication, alignment is done at the remote subscriber unit, without changing the base station beam position, and the process is done by mechanical alignment. Although robust, the admittance process depends on costly manpower activity. In the event of network topology changes, a repeat operation is necessary to realign the subscriber radios or transceiver nodes towards the new base station location and to change the frequency to a newly assigned sector frequency.

Accordingly, there is a need for an improved method for admitting a new node to a network in general. In particular in a wireless mesh topology network where the network grows organically, a new node added to the network must join via one out of many already existing network nodes. An automatic process, which aligns electronically the directions of the reception beam of a joining node with the transmission beam of one of the inviting network nodes at specific time and frequency, is an important improvement to the mechanical alignment art.

BRIEF SUMMARY

By way of introduction, the present embodiments provide a join process for a wireless mesh topology network where network nodes have multiple spatial coverage sub-sectors together covering a larger sector angle and where a node can establish connection with other nodes located in directions covered by its sub-sectors. The join process adds a joining node to the network and includes listening at the joining node to its sub-sectors at a specific receiving frequency for a defined time. The joining node thereafter changes its sub-sectors and its receiving frequencies according to a defined timing and sequence. Active network nodes transmit organized invitation data packets on defined sectors, frequencies and timing, based on relative location and relative angle orientation deduced from sub-sectors already used for existing internal network communication. This reduces frequency interference and reducing time required for the join process.

The present embodiments further provide a method for admitting a joining node to a wireless mesh network. The method includes transmitting an invitation packet from one or more active nodes of the wireless mesh network at synchronized, scheduled transmission times and scheduled transmission directions over defined spatial directions. After a delay time, a transmitted response is detected from the joining node at defined spatial directions.

The present embodiments further provide a method for adding a joining node to a wireless mesh network, the network including at least a first network node and a second network node. The method includes in one embodiment receiving location information for the joining node and designating at least one network node for initiating communication with the joining node. The method further includes transmitting invitation packets at the at least one network node in a direction towards an anticipated location of the joining node and receiving an answer at a network node in response to an invitation packet.

The present embodiments further provide a method for adding a joining node to a wireless mesh network including one or more network nodes. In one embodiment, the method includes designating at least one network node for initiating communication with the joining node and, at the at least one network node, to initiate communication with the joining node, scanning on a first sector with highest probability of locating the joining node. Subsequently, the method includes scanning on sectors of lower probability of locating the joining node and receiving an answer at a network node in response to an invitation packet.

The present embodiments further provide a method for admitting one or more joining nodes to a wireless mesh network. One embodiment of the method includes scheduling transmission of data packets by inviting network nodes on defined frequency channels and at defined directions to create spectral activity for detection of the spectral activity by the one or more joining nodes. At a joining node of the one or more joining nodes, the method includes scanning the spectrum and different spatial directions to identify radio frequency activity of the inviting network nodes at the defined frequency channels, identifying spatial directions toward the inviting network nodes and tuning to a defined frequency channel in the identified spatial direction to receive an invitation packet transmitted by the inviting network nodes between the data packets.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

The present embodiments describe a novel automatic join process method and apparatus designed to admit spatially dispersed wireless nodes to a wireless network using a time, frequency and space synchronized algorithm of both the inviting network nodes and the joining node. The new automatic generic join algorithm process is designed to admit a wireless network node which includes a space diversity antenna. The new network node is added to a wireless network including other wireless nodes each of which also include a space diversity antenna. In this novel network topology, it is necessary to simultaneously adjust the beam lobes of the inviting network nodes in the direction of the joining node while synchronizing the transmission and receiving time and frequency, with minimum interruption and minimum overhead to the network existing communication traffic.

The illustrated method is generic for different types of beam steering technologies. Examples include those implemented with phase array antennas, electronically beam switching or beam steering, based on single antenna, or electronically beam switching between multiple antennas covering different spatial sectors.

The current embodiments describes a network where the new joining node spatial beam diversity is accomplished by having a transceiver capable of switching (or steering) its beam-lobe from one angular direction to another in order to direct its receiving and transmitting lobe towards existing neighboring network-nodes. Simultaneously other neighboring network-nodes with which communication is scheduled adjusts their Transmit/Receive beam-lobes respectively towards different directions in order to transmit invitation packets towards the new joining nodes. The mutual alignment process between the beam of the inviting node in the network and the beam of the joining node which search for the invitation packets in order to admit itself to the network, is designed to synchronize the two steered beams in specific time space and frequency channel.

The embodiments described herein may be used in conjunction with a wireless MESH topology networks from the type described in U.S. patent application Ser. No. 09/187,665, entitled "Broadband Wireless Mesh Topology Networks" and filed Nov. 5, 1998 in the names of J. Berger and I. Aaronson, and to network nodes including switched multi-beam antenna designs similar to the design described in U.S. patent application Ser. No. 09/433,542, entitled "Spatially Switched Router for Wireless Data Packets" and filed in the names of J. Berger at el. Both application Ser. No. 09/187,665 and application Ser. No. 09/433,542 are incorporated herein by reference.

Figure 1:
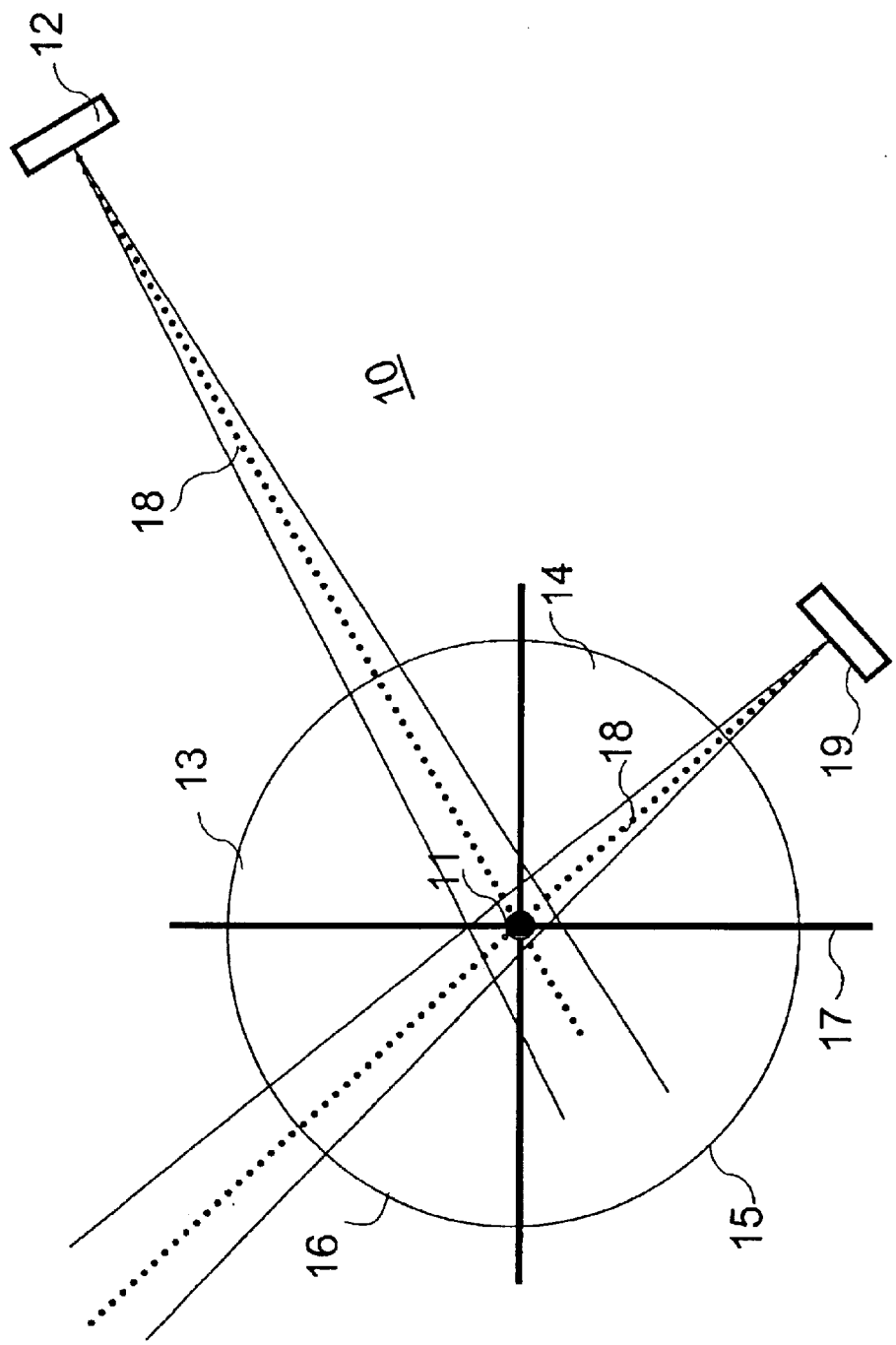
FIG. 1 shows a diagram of a prior art point to multi point based wireless network.
Figure 2:
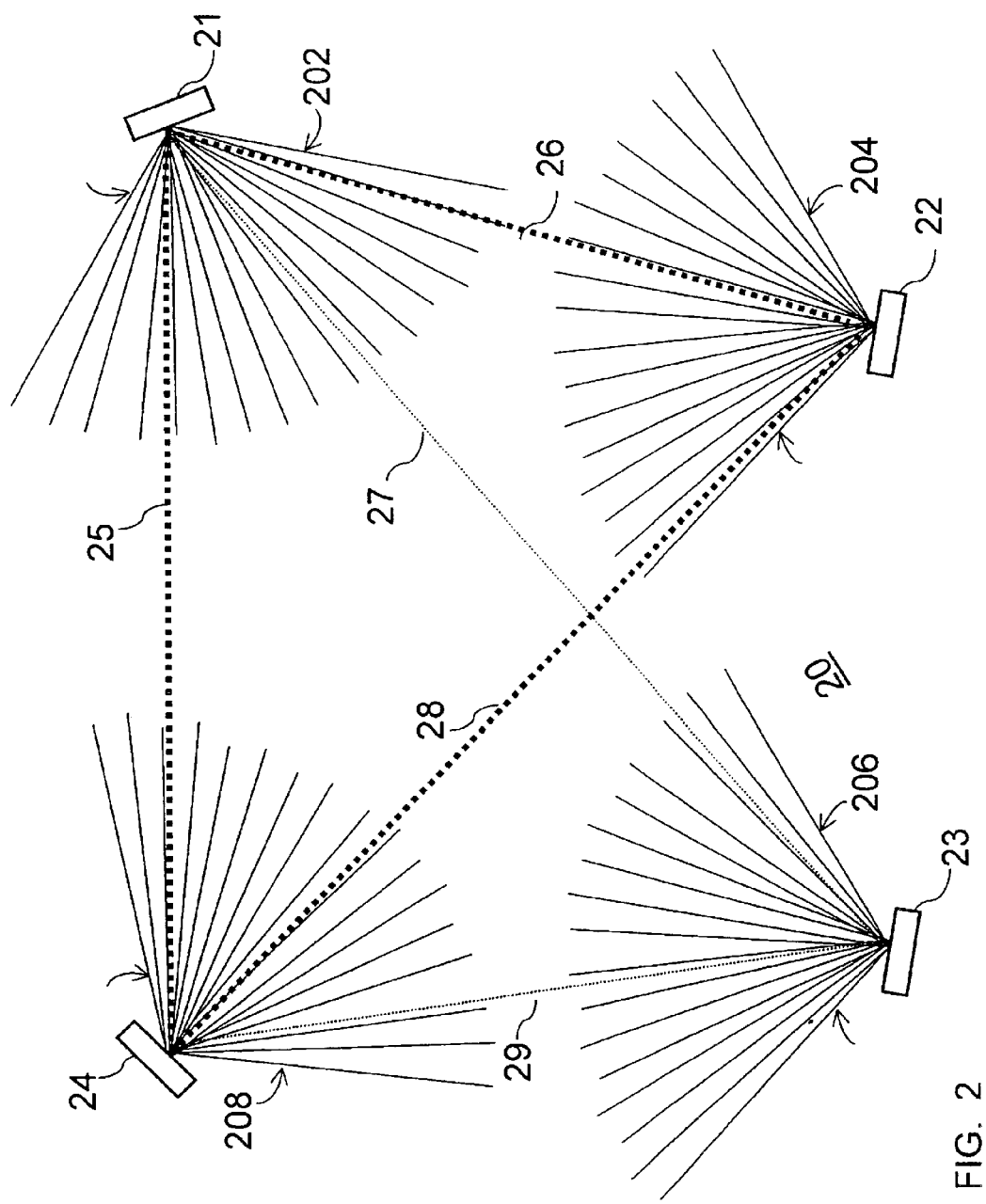
FIG. 2 shows a diagram of a wireless mesh network.

Referring now to FIG. 2, it shows a wireless mesh topology network 20. The wireless network 20 of FIG. 2 includes three active nodes, including node 21, node 22 and node 24, and a joining node 23 which seeks to join the network. In one embodiment, the nodes 21, 22, 23, 24 communicate user data from one or more subscriber radios in radio communication with one or more nodes. The wireless mesh topology provides a plurality of connections between a device originating data and the ultimate destination of the data.

The organization of the wireless network 20 is exemplary only. Other embodiments will include other quantities of network nodes oriented in different directions. For example, in one embodiment, the network 20 further includes a control node which provides control functions for the network 20. The control node may be one of the wireless network nodes 21, 22, 23, 24 which communicates user data or may be a separate node dedicated to control functions for the network 20 and in wireless or wireline communication with nodes of the network 20.

The network nodes 21, 22, 23, 24 may all be substantially identical or may differ in their design. However, each of the nodes 21, 22, 23, 24 is configured for two-way radio communication with one or more remotely located radio devices such as other network nodes.

Each of the network nodes 21, 22, 23, 24 includes an antenna with electronic beam steering capability. The antenna of each of the network nodes 21, 22, 23, 24 covers a large sector of approximate 120 degrees (or any other coverage sectors size). Thus, network node 21 includes an antenna covering a sector 202; network node 22 includes an antenna covering a sector 204; network node 23 includes an antenna covering a sector 206; network node 24 includes an antenna covering a sector 208. Each sector 202, 204, 206, 208 includes sixteen sectors, also referred to as sub-sectors. Each sub-sector covers 7.5 degrees. Each sub-sector may be identified in any suitable manner. In one example, the sixteen sub-sectors are identified as sub-sector (0) to sub-sector (15) respectively.

In the wireless network 20 of FIG. 2, each node in the network communicates data with an adjacent node over a radio link established between the node and the adjacent node. Thus, network nodes 21 and 22 communicate via an established radio link 26, node 21 and node 24 communicate via radio link 25 and node 22 and node 24 communicate via radio link 28.

As shown in FIG. 2, new or joining node 23 is joining the network 20. The initial position of the joining node 23 allows the creation of a link 27 with node 21 and a link 29 with node 24. However, as shown in FIG. 2, the sector 204 associated with node 22 and sector 206 associated with node 23 do not overlap. There is no direct line of sight path between the directional antennas of nodes 22, 23. Due to these non-overlapping sectors 204, 206, node 22 and node 23 are unable to communicate directly.

Figure 3:
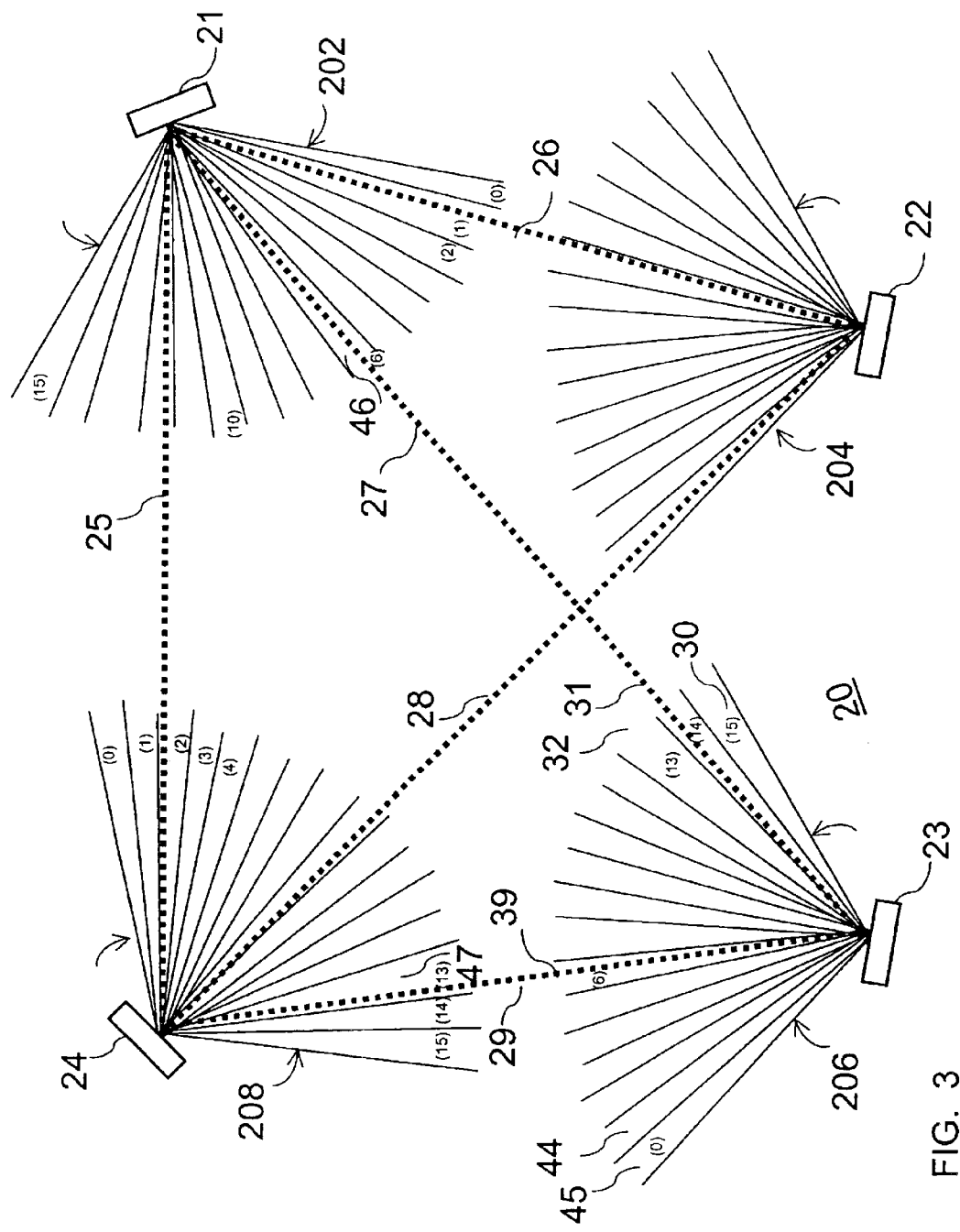
FIG. 3 shows the wireless network of FIG. 2 after a new node is joined to the network.

FIG. 3 illustrates the wireless mesh topology network 20 of FIG. 2 after completion of the join process to add node 23 to the network 20. In FIG. 3, radio link 29 has been established between joining node 23 and active node 24. Radio link 27 has been established between joining node 23 and active node 21. The joining node 23 is now an active node of the network 20.

FIG. 3 illustrates some of the individual sub-sectors of the sectors 202, 204, 206, 208 associated with the nodes 21, 22, 23, 24 of the network 20. In the illustrated embodiment, joining node 23 selected sector 31, also identified as its sub-sector (14), to communicate with sector 46 of node 21, also described as its sub-sector (6). Further, joining node 23 selected sector 39, corresponding to its sub-sector (6) to communicate with node 24 sector 47, also identified as sector 13 of node 24.

Figure 4:
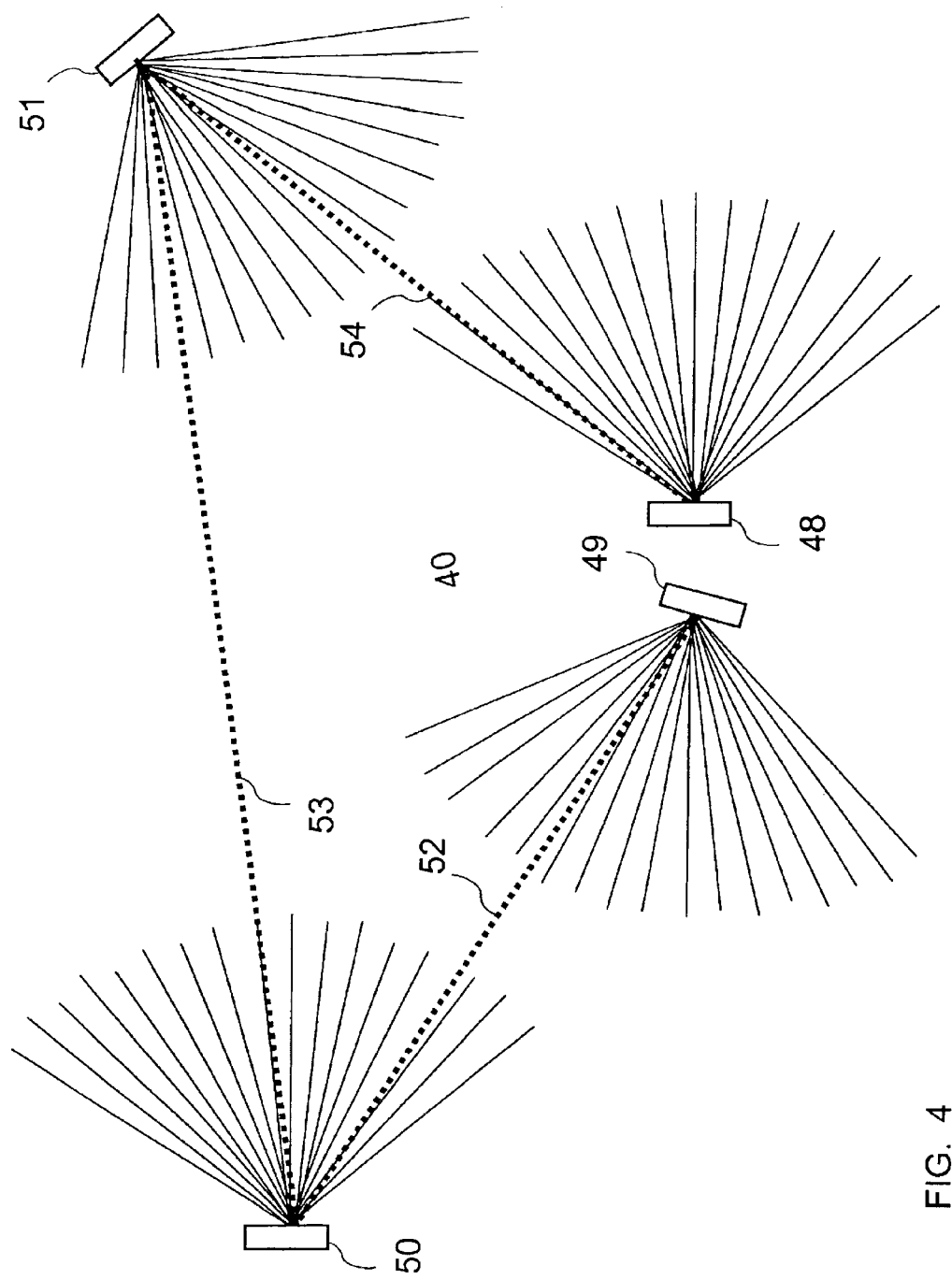
FIG. 4 is an alternative embodiment of a diagram of mash based a wireless network.

FIG. 4 illustrates an alternative embodiment of a wireless mesh topology network 40 including in the illustrated embodiment network nodes 48, 49, 50, 51. In the network 40, node 48 can communicate with node 51 via a radio link 54. Similarly, node 51 communicate with node 50 via radio link 53 and node 50 communicate with node 49 via radio link 52. However, sectorial coverage for node 48 does not overlap with sectorial coverage for node 49 or with sectorial coverage for node 50. Similarly, node 49 sectorial coverage do not overlap with sectorial coverage for nodes 48 or sectorial coverage for node 51.

In the arrangement network 40 of FIG. 4, the mutual spatial location and sectorial coverage orientation of the nodes 48, 49, 50, 51 can be used to arrange or coordinate the invitation process by which invitation packets are transmitted for reception by a joining node. In the particular arrangement of FIG. 4, node 48 is not invited by node 49 and node 50. That is, node 48 will not receive an invitation packet transmitted by either node 49 or node 50. Similarly, node 49 may be invited to join the network 40 by node 50 but can not be invited by node 48 or node 51. Due to the non-overlapping sectors of nodes 48 and 49, nodes 50 and 51 can invite them at the same time and frequency.

Preferably, the physical location of the active and joining nodes as well as the directionality of sectorial coverage of the active and joining nodes, is considered prior to initiating the join process. By using this information, the join process may be optimized by reducing the amount of time and the number of invitation transmissions required to complete the join process and add one or more new joining nodes to the network 40.

Figure 5:
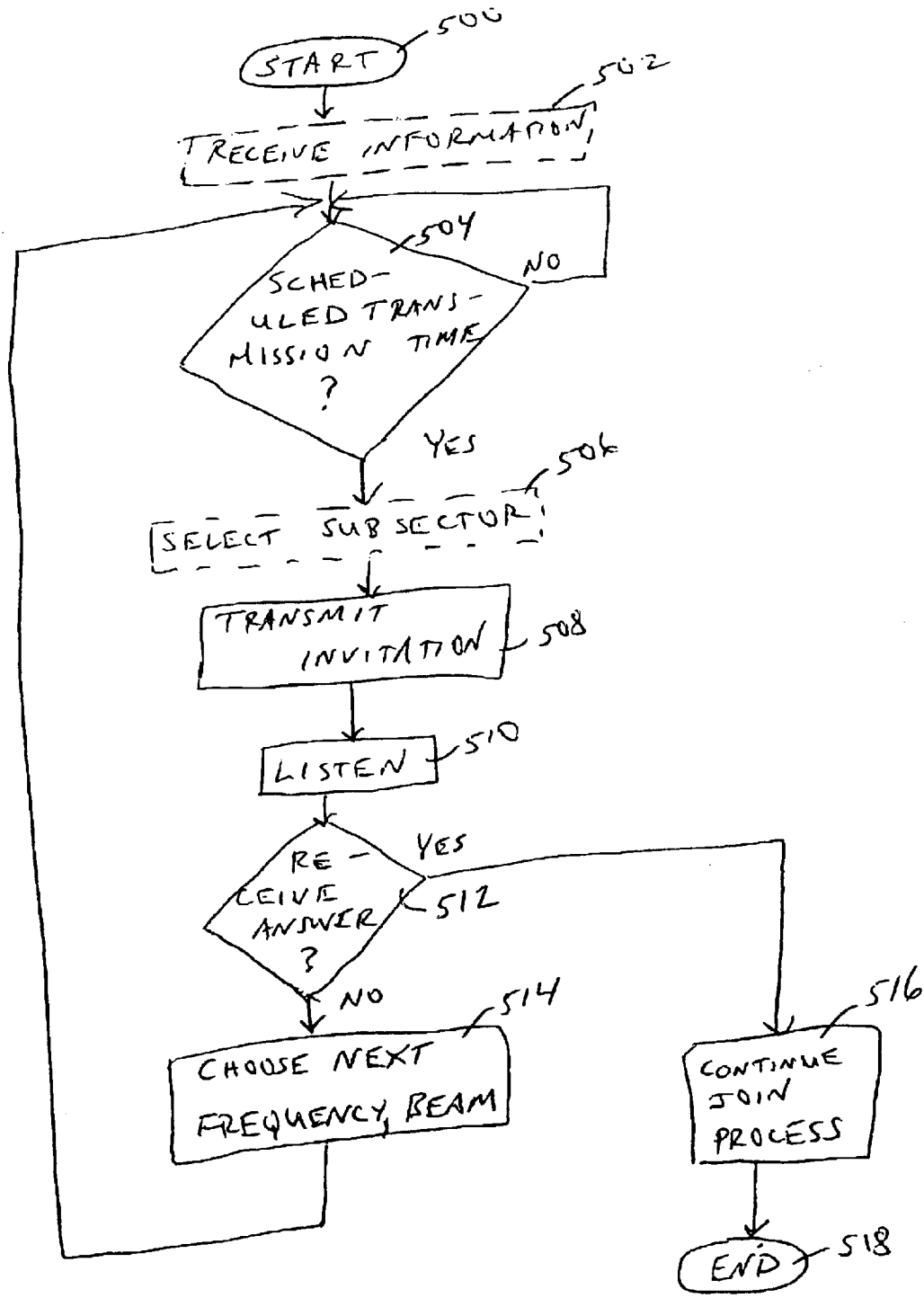
FIG. 5 is a flow diagram illustrating operation of a network node of the wireless network of FIG. 2.

FIG. 5 is a flow diagram illustrating operation of a network node of the network 20 of FIG. 2. The method acts illustrated in FIG. 5 may be performed as part of a join process for adding a joining node to a network of established, active nodes. The method begins at block 500.

At optional block 502, the network node receives information about positions of active nodes in the network and about the position of the joining node. The information about a new node's topographical location may become available to the network and its nodes through the use of a GPS device associated with the joining node or installation personnel, through a computerized map or through other manual or automatic means of computer input. The information is transmitted to the node for processing.

Block 502 and other blocks of the drawing figures is shown in dashed lines to indicate that it may be optionally included. It is to be understood that the acts indicated in the drawing figures are exemplary and may be deleted, supplemented or rearranged in any suitable manner.

At block 504, the network node determines if the current time matches a transmission time for transmitting an invitation to a joining node. Transmission of the invitations is scheduled so that only one network node or set of nodes transmits at a time towards a specific direction and specific frequency channel. All other nodes have a time frame, which encompasses the length of the invitation plus the maximum propagation delay, in which they are silent and listen. It is possible for more then one node to transmit at a time, if there is no possibility of interference with each other at any listening node. For example, in the embodiment of FIG. 4, nodes 48 and 49 may transmit an invitation at the same time and same frequency. This is because it is not possible for a joining node to be within the coverage area of both nodes 48 and 49 at the same time.

At optional block 506 of FIG. 5, the network node selects a sub-sector for transmitting the invitation. This act may be particularly applicable in an embodiment like FIG. 3 in which each node includes a highly directional antenna capable of transmitting and receiving on narrowly defined sub-sectors within a larger sector. When the coverage angle or sector is subdivided into smaller sectors or sub-sectors, then the invitation is sent every time on a different sub-sector in such a way that over a defined amount of time all sectors are used. For example, if the antenna coverage angle for a sector is 120 degrees, but this angle is subdivided into 16 sub-sectors of 7.5 degrees each, invitation packets are sent over one sector at a scheduled time so that after 16 transmissions the whole antenna coverage angle was used. Different scanning based on prior knowledge of the approximate location of the joining node can be implemented as well to reduce the joining time.

Further, in addition to a sector, at block 506 a frequency may be selected or assigned for transmission of the invitation. When transmission is possible at several frequency channels, multiple combinations of sectors and channels are used. For example, a 16-sector antenna of a node in a network which operates at 2 different frequencies will transmit invitation packets at 32 pre-defined times (2×16=32 times), using the assigned combinations of frequencies and sectors. In this example, if an invitation is sent every 100 milliseconds, all the possible combinations will be covered in 3.2 seconds duration.

At block 508, the invitation is transmitted from the node for reception by a joining node. The invitation preferably has a predetermined format which is expected by and recognized by the joining node. The transmission may have any format and content suitable for performing the joining process described herein. At block 510, after sending the transmission, the node of the network listen for a response or answer transmitted by a joining node in response to receipt of the invitation. Listening is accomplished in the illustrated embodiment by activating a receiver circuit of the node and scanning one or more predefined sectors or frequencies using the directional antenna of the network node. In the simple Time Division Duplex case for example the receiver is tuned to the same frequency and same beam direction of the transmitted invitation.

At block 512, the node determines if it has received an answer. If not, at block 514, a next frequency and antenna beam or sector is chosen for transmission of another invitation. Control then returns to block 504. If an answer was received at block 512, at block 516 the join process is continued. The established network node exchanges information with the joining node including information defining the locations of other adjacent nodes available for radio communication with the joining node.

Figure 6:
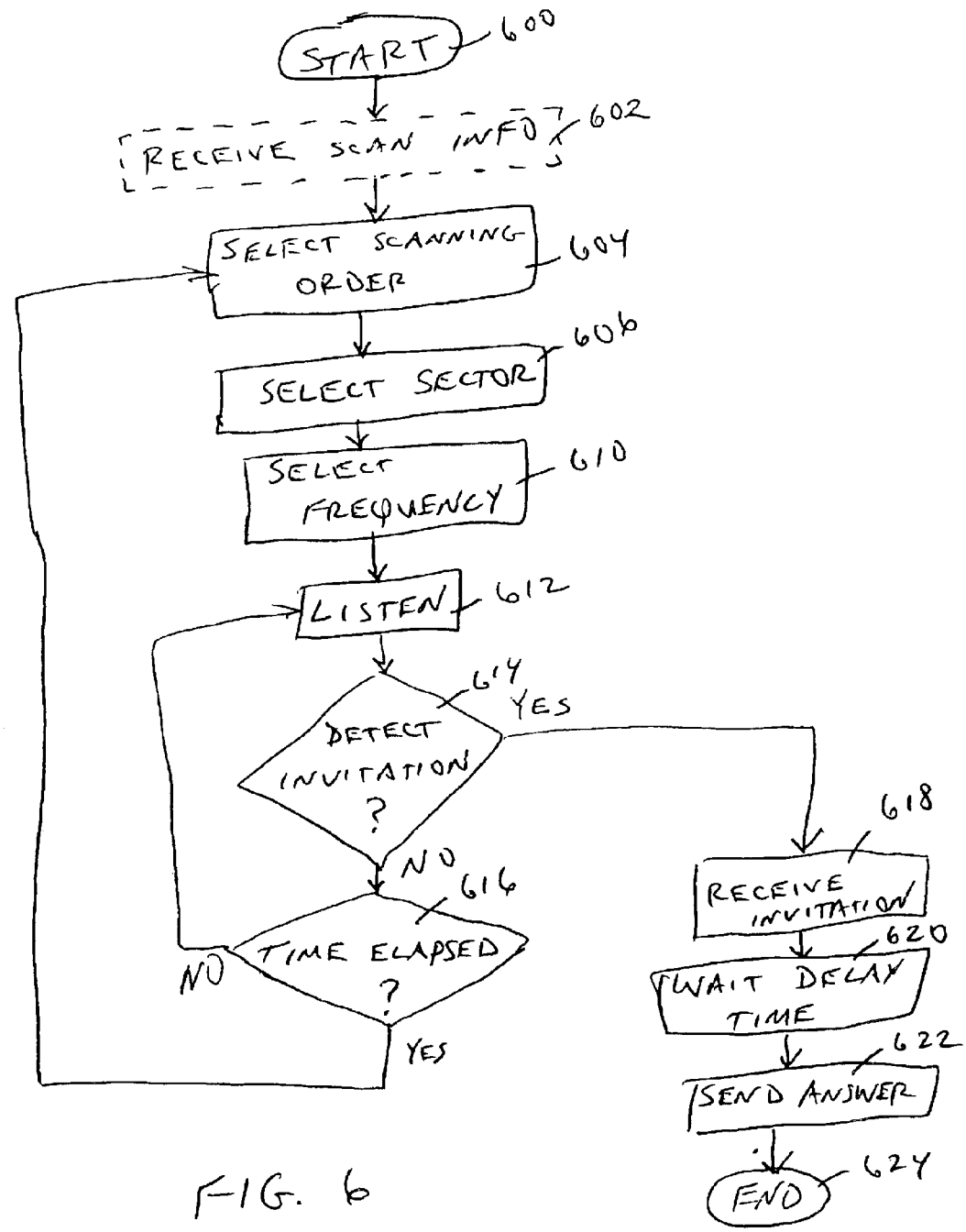
FIG. 6 is a flow diagram illustrating operation of a joining node of the wireless network of FIG. 2.

FIG. 6 is a flow diagram illustrating operation of a joining node joining the wireless mesh topology network 20 of FIG. 2. FIG. 6 illustrates a method for implementing the join process by which the joining node is admitted to the network.

In general, according to the illustrated embodiments, each active node that is already in the network sends a packet at pre-scheduled times. This packet is called an invitation packet. When a joining node receives an invitation from a network-node to which it was not previously connected, and they both belong on the same network and have authorization to create a link between them ("join"), the joining node answers after a predefined delay. This predefined delay is transmitted as a part of the invitation packet. The inviting network node knows that it needs to listen to an answer at that time plus the uncertainty of the propagation delay. An authorized answer or join request will start a sequence that will end with a full join.

The method begins at block 600. At optional block 602, the joining node receives scan information for use while performing the join process. For example, the scan information may tell the joining node what times to scan, what frequencies to scan and what directions to scan. The joining node may receive the scan information in any convenient manner, such as by wireless transmission, by wireline communication or by manual communication by an installer.

At block 604, the joining node selects a scanning order. The scanning order may define particular frequencies or directions to scan and the relative order for scanning. The scanning order selection may be made in response to the scan information received at block 602. At block 606, the joining node selects a sector of its direction antenna to use for scanning for an invitation. The sector selection may be made in response to the scan information received at block 602. At block 610, the joining node selects a frequency for scanning. The frequency selection may be made in response to the scan information received at block 602.

At block 612, the joining node listens for a transmitted invitation. The invitation has a predetermined format which is expected by the joining node. Listening is accomplished by activating a receiver circuit of the joining node and detecting, demodulating and decoding received transmissions.

If no invitation is received and recognized, at block 614, control proceeds to block 616 where it is determined if a scan time has elapsed for the joining node. If not, control returns to block 612 to continue listening for an invitation. If the scan time has elapsed, control returns to block 604 where a new scanning order is determined. The new scanning order may use different directions, different frequencies or other variations to locate an invitation transmission.

If at block 614 an invitation is received and recognized, control proceeds to block 618. At block 618, the invitation is received. After waiting a predetermined delay time period, block 620, an answer is transmitted by the joining node. The answer may have any suitable format or content. Preferably, the answer has a predetermined timing and format which are received and recognized by one or more network nodes.

In the illustrated embodiment, each joining node will listen on only one sector at one specific frequency at a time. The joining node will continue to listen on that sector for as many scheduled invitation transmissions as necessary in order to guarantee that the inviting node has sent an invitation on all possible allowed frequency bands and on all possible sectors. In the previous example, where an invitation was sent every 100 milliseconds for 32 times, the node will wait at the given sector and tune to receive a signal at a defined frequency band for 3.3 seconds plus the duration of the invitation packet. That is the worst case time that it will take to receive an invitation under the above described given conditions.

In alternative embodiments, it may be preferable to reverse the roles of the inviting node and the listening nodes, so that the inviting node will send the invitation on one sector enough times to ensure that the listening nodes search for the signal at all possible coverage angle and frequency channels. The process scans all allowed sectors and frequencies combinations covered in a defined amount of time.

If two joining nodes answer the same invitation from the same network-node at the same time, there may be a collision of their transmissions. When a collision happens, the network node detects only noise, as if no answer has been received. Collisions can be resolved by having the listening nodes scan their sectors or frequency bands in a different order every time, and in a different order from their neighbors. That way, the next time there is an invitation from the same inviting network node on the same sector, the two original joining nodes which have collided will not look at the inviting node at the same time, or at the same frequency, reducing or eliminating the possibility of a collision.

Figure 7:
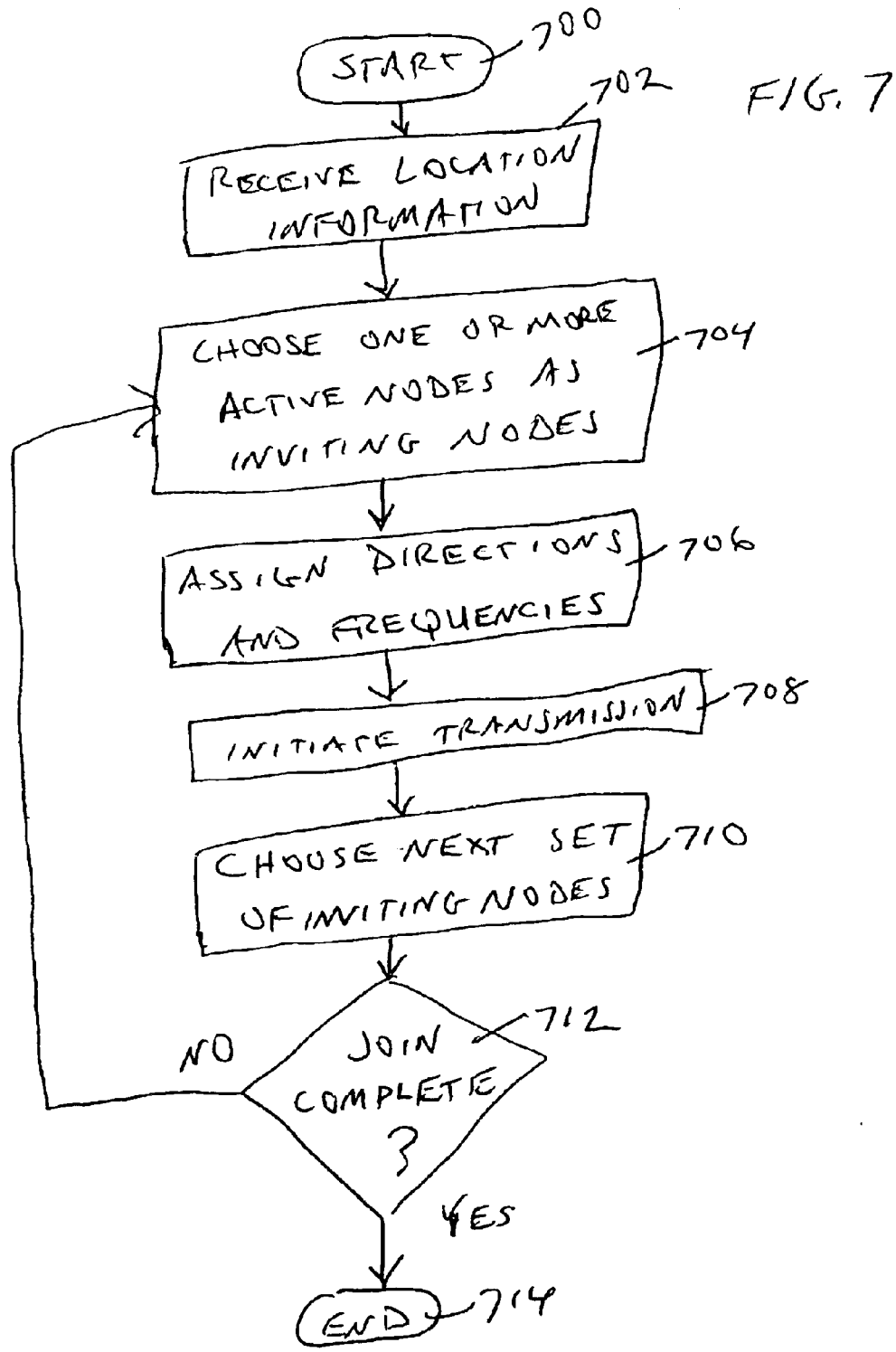
FIG. 7 is a flow diagram illustrating operation of a control node of the wireless network of FIG. 2.

FIG. 7 is a flow diagram illustrating operation of a control node of wireless mesh topology network 20 of FIG. 2. As noted above, a control node or network computer server may be included in the network to provide control or oversight functions. The control node or computer server may be connected by wireless or wireline links to one or more active nodes of the network.

The aforementioned fully automatic join process can be shortened by having a control node or central computer server or one of the nodes authorize only certain network-nodes, sector and frequency combinations to issue the invitation. For example, in FIG. 2, if node 23 is newly installed, it is possible to remove node 22 from participation in the join process if it is known that there is no possible connectivity between nodes 23 and 22. The non-connectivity could result from a missing line of sight or due to node 22 coverage angle non-overlapping with those of node 23. In such a case, reducing the set of possible nodes may reduce the time it takes to automatically link the new joining node to the network-nodes 21 and 24.

Based on the positions and the relative angle orientation of the various existing network-nodes the method is able to prioritize the join process to shorten time duration of the join process. For example, based on the sectors already used to communicate between the existing network nodes in the network 20 of FIG. 3, and assuming a prior knowledge of the topographically approximate location of a node 22, the network calculates that a link 29 may be established with node 23 by node 24 via sector 47. The join process will prioritize the system to have the next invitation starts at a chosen node and at a chosen sector at predefined chosen frequency. The joining node will scan its sector by tuning its receiver to the possible allowed frequencies. This can minimize the time required to admit the new joining node into the network. The method begins at block 700.

At block 702, location information is received at the control node or computerized server. The information about a new node topographical location may become available to the network through the use of a GPS device associated with the joining node or installer, through a computerized map or through other manual or automatic means of computer input. The network server nay choose a set of likely links based on a geographic database and the network topology, restrict the automatic new link establishment to the likely links only, and prioritize the invitations, saving time. Once a link is established to a new node, knowledge of the joining-node azimuth angle orientation is established. This angular orientation is deduced from knowing the sector number of, for example, link 29 between node 23 sector 39 and node 24 sector 47 in FIG. 3. This information serves to generate an even more accurate position estimation that identifies the most likely other links to the joining node can be established, such as link 27 between node 23 sectors 31 and node 21 sector 46 of FIG. 3. This further prioritizes the join process and minimizes the joining time process.

At block 704, based on the received location information, the control node chooses one or more active nodes as inviting nodes. As noted, the choice may be made to minimize the joining time or to optimize any other parameter. At block 706, the control node assigns directions and frequencies for antenna beams of the chosen inviting nodes. Again, the choice may be made based on the received location information and on any other preferred criteria. At block 708, the control node initiates transmission. This includes in one embodiment, for example, transmitting the beam direction and frequency information to the chosen nodes along with a timing indication defining the time when transmission should start.

At block 710, the control node chooses the next set of inviting nodes. Once all relevant combinations are covered, another set of nodes becomes the inviting nodes. The next set can be chosen randomly, pre-programmed from a central computerized server, or chosen using any other technique such as a method based on finding the nearest network node with high potential coverage of the joining node location. The members of the inviting set of nodes are preferably predefined to reduce or minimize the possibility that the new joining node can be within the coverage angle of more than one network node at the same time.

At block 712, the control node determines if the join process is complete. It may accomplish this, for example, by monitoring communications among nodes of the network confirming the join process or by receiving a confirmatory communication from the joining node or another active node. If the join process is not complete, control returns to block 704 to select nodes as the inviting nodes. If the join process is complete, the method ends at block 714.

The disclosed embodiments will now be described by several implementation examples. First, in the wireless mesh topology network 20 of FIG. 3, nodes 21, 22 and 24 are network-nodes linked by wireless connections designated by dashed lines 25, 26 and 28. Node 23 is a newly installed node of the network 20 that is able to join the network via wireless link 27 with node 21 and link 29 with node 24. Each node 21, 22, 24 has a sector, including sectors 202, 204, 208, respectively, designated for radio communication and served by a scanning directional antenna with a beam that can be switched to each one of the sub sector's directions. As illustrated in FIG. 3, the sub-sectors associated with each node are designated by numbering them in a clockwise direction, starting with sector (0) and ending with sector (15).

Before the new node 23 is introduced to the network, it is preprogrammed with a possible list of network operational frequencies {f1, f2, f3, f4}. This programming may be accomplished by wireless or wireline programming by an installer or by other personnel. The list of frequencies and other programmed information is stored at the joining node 23.

As part of the join process, nodes 21 and 24 are instructed to look for the new node 23 and establish a radio link with the joining node 23. These instructions and the associated control information may originate at a control node associated with the network 20, a computerized server, or may originate with one of the communication nodes 21, 22, 24 of the network 20. Alternately, the information may be provided by installation personnel involved in installing the joining node 23. Other sources of control and positioning information may be used as well.

In one embodiment, where no information is available regarding the location of the new node 23, a full sectorial scan will be conducted to locate the node 23. In an alternative embodiment according to this example, information about the approximate location of the joining node 23 is known and invitation is limited to communicated from and to the nodes 21, 24.

To begin communication for the join process, node 21 and node 24 start sending invitation packets by scanning on any suitable number of specified sectors. For this example, the nodes 21, 24 begin transmitting on 9 selected sub-sectors out of the total 16 available sub-sectors. The 9 selected sectors are preferably centered on the expected direction towards the joining node 23. Node 21 is instructed to scan at frequency f1, and node 24 is instructed to scan at a different frequency f2. Both nodes 21, 24 may start to scan at the same time, since they are at different frequencies, and therefore will not cause interference on the receiving node 23. In another embodiment, the two nodes 21, 24 could scan using the same frequency. Using different frequencies reduces the chances for a collision at the new node 23. By scanning, it is meant that the nodes 21, 24 transmits a predefined invitation packet at predefined times and predefined frequencies on predefined sub-sectors of the sector 202, 208 associated with the nodes 21, 24.

In the above example node 21 will send an invitation packet on its sectors (2) to (10). It will start with sector (6), because this sector will be assigned the highest probability of being in the right direction. It will then scan lower probability sectors by scanning sectors (5), (7), (4), (8) (3), (9), (2), (10), in that order. In other words, the node 21 scans a highest probability sub-sector first, sub-sector (6), where the highest probability sub-sector is in a direction of highest probability for locating the joining node based on positional information received by the network. Subsequently, a first sector, sector (5) on a first side of the highest probability sector (6) and immediately adjacent to the highest probability sector (6), and a second sector, sector (7) on a second side of the highest probability sector (6) and immediately adjacent to the highest probability sector (6), are consecutively scanned. Scanning fans out by sector from the highest probability sector (6), scanning one sector on each side of the highest probability sector (6) and then jumping to a sector immediately adjacent to a previously scanned sector on the other side of the highest probability sector (6).

Another possible scan is by jumping at least two sectors at a time and then cover the middle sectors such as first scanning sectors (6), (4), (8) and then scanning sectors (2), (10), (5), (7), (3), (9). In other words, in this embodiment, node 21 scans a highest probability sub-sector first, sector (6), where the highest probability sub-sector is in the direction of highest probability for locating the joining node based on positional information received by the network. Subsequently, a first sector, sector (4) on a first side of the highest probability sector (6) but not immediately adjacent to the highest probability sector (6) is scanned. The immediately adjacent sector to sector (6), sector (5), is skipped. After sector (4) is scanned, a second sector, sector (8), on the second side of the highest probability sector (6) is then scanned.

This second scanning sequence covers larger range initially and may reach admittance of the joining node faster. Eventually both scans fully covers each one of the sectors. The second scan process may reach earlier communication with the joining-nodes even if they are in the direction of the adjacent sectors by receiving signal via antenna sidelobes. That is, since the boundaries of the antenna sectors are not sharply defined, energy transmitted in an adjacent sector may be received in a sector currently being scanned. Skipping sectors adjacent to previously scanned sectors utilizes this phenomenon to reduce the time required to locate the joining node. After locating the transmission from the joining node 23, the node 21 then fine tunes its communication with the joining node 23 to optimum reception via mutual lobe alignment. The establishment of communication using adjacent sectors can be achieved by using lower modulation rate for the join process initially and thus higher system gain to overcome the potential higher link attenuation, between −3 dB to −14 dB when non perfect alignment exist.

During the time when node 21 is scanning at f1, node 24 is also instructed to scan using frequency f2, with the most likely direction being its sub sector (13). In one embodiment, node 24 will scan in the following sector order: (13) (11), (15), (9), (12), (14), (10). This covers all sectors that are ±4 sectors or less away from the higher probability sector number (13). The scanning starts with the highest probability sectors and ending with the lowest probability sectors, repeating on the odd sectors after the even sectors are exhausted or vice versa, depending on the starting sector. Here, the odd sectors are the first, third, fifth, etc. sector on one side of the highest probability sector. The even sectors are the second, fourth, sixth sectors, etc., on the one side of the highest probability sector. Other scanning formats are possible as well as scanning a larger range when no prior information is available or smaller range when accurate direction information is available.

Initially the joining node 23 is not connected to the network as in FIG. 2. It will automatically listen on its sub sector (0) using a first frequency f1 for a predefined time. This predefined time is preferably sufficient to cover at least one entire scan of the inviting nodes at a given frequency. Then it will listen on sector (2) using frequency f1. Here again, the node may jump over one sector, scanning a sector which is not immediately adjacent the first scanned sector. This may be beneficial if the originally scanned sector receives invitation packets transmitted on the adjacent sub sectors because of the antenna side-lobe pattern possible invitation signal detection while operating at higher link gain through the joining process.

After listening on sub sector (2), joining node 23 will jump to sub sector (4) and will subsequently continue with the even numbered sub sectors. If no invitation packet is located, the node 23 will listen on the odd sectors. In some embodiments, odd sector scanning can use a second frequency f2. It is possible that if an invitation was transmitted on frequency f1 on any sector, the node 23 would have detected the transmission using the even sectors only. The node 23 then scans either the odd or even sectors using a third frequency f3, then scans again with a fourth frequency f4. The node 23 then repeats the cycle, listening at the odd sectors when the previous scan at that frequency scanned the even sectors, and visa versa. This scanning process continued until an invitation to join the mesh network is received. Other scan modes such as sequential scan from sector (0) to (15) or from the center sector (6) towards the first side and the second using even sectors and then odd sectors can also be used by the joining node.

In one example, the first invitation is received by the joining node 23 on its sector 5 (FIG. 3), using the second frequency f2. The invitation is sent by node 24 on its sector (14) rather than the more accurate sector (13). Note that either the receive sector at the joining node or the transmit sector at the established network node needs to be aligned correctly with a node at the other end of the radio link. Only one of the sectors can be the adjacent sector, if success is to be assured.

Upon receipt of an invitation packet, node 23 stops scanning and ceases to look for further join packets. Node 23 optimizes the direction of communications with node 24 sector (13) and its sector (6). Node 23 initializes and synchronizes all processes necessary to join the network 20, and is admitted into the network 20.

Information is gathered by the network 20 so that the network 20 knows the approximate positions of nodes 21, 23, and 24, and the sectors on which the best communication can be maintained for the existing links 25, 27, 28, 29. The network 20 calculates the correct sectors on which it will get the best communications between nodes 23 and 21. Since node 23 is already admitted to the network and can communicate with the network, the network coordinates the time and frequencies used to establish the next link between the joining node 23 and another established node of the network (not shown in FIG. 3).

In this example, node 21 sends an invitation packet to node 23 at frequency scanning its sectors (6), (5), (7). In the invitation packet, node 23 is invited to listen for a join packet at the same frequency on its sector (14), sector (15) and sector (13). Node 21 then transmits the join packet to those respective sectors, in one embodiment repeating the transmission for a total of three transmissions. Other numbers of transmissions could be applied. Alternatively, acquisition might also be achieved via side lobes at the joining node 23 by listening on sectors (15) and (13). Because of the side lobes effect, establishment of communication is highly probable in within 3 attempts. Thereafter, network node 21 and joining node 23 optimize their alignment by searching for maximum link gain, ending with alignment between node 21 sector (6) and node 23 sector (14).

Another example combines narrow and wide field of view search for the join process. This example incorporates a fast scan of a subset of sectors towards the approximate estimated or known direction of a joining node and a slow scan that covers the full field of view in order to access nodes with no advance knowledge of their position. This combined narrow and wide field of view search join process accommodates joining nodes whose position is random, uncertain, or whose initial location coordinate is inaccurate. This process also accommodates new joining nodes whose position is known up front to the active-nodes of the network.

When some joining nodes respond together to an invitation, the network node receiving the responses cannot decode the signal. As a result no response will be initiated back to the joining node. In this example, the joining nodes will initiate an exponential back off process to increase probability of avoiding future collision. An exponential back-off algorithm is used in IEEE 802.3 MAC protocols for collision resolution. See also A. S. Tanenbaum, Computer Networks, 3rd Edition, Prentice-Hall, Upper Saddle River, N.J., 1996.

According to the exponential back-off process, if the joining node does not receive a response to its invitation from the inviting network node, (due to collision or other reason), the next time the joining nodes receive an invitation, they will respond only to half of the invitation packets arrived since the previously received invitation packet. This reduces the probability for collision and interference with the rest of the simultaneously joining nodes. Some of the subsequently received invitation packets will be ignored and the one or ones responded to may be chosen randomly or pseudo-randomly or in any suitable manner to reduce the probability of a subsequent collision.

In another example, in order to accelerate the joining process the joining node may use fast spectral activity mapping to identify those frequency channels where network-nodes-are-actively operating. In this process, the network nodes can tune to listen for an invitation on active frequency channels. The joining node scans the spectrum in different spatial directions to identify radio frequency activity of the inviting network nodes at defined frequency channels. The joining node then identifies spatial directions toward the inviting network nodes using the detected spectral activity and then tunes to one or more defined frequency channels in the defined direction to locate an invitation packet transmitted by an inviting node. Using this technique, the joining node can reduce the number of frequencies scanned at each individual direction from all-possible frequencies to only those frequencies where it monitors spectral activity. In this process, a joining node incorporates a switched array antenna which is capable of simultaneously activating all the sectors or any partial set of sectors of the antenna. An example of such a node is described in detail in patent application serial No. 09/433,542, "Spatially Switched Router for Wireless Data Packets," by J. Berger at el., commonly assigned with the present application. The node can switch single or multiple sectors to detect the level of spectral activity at a specific frequency channel.

In one embodiment, one or more of the established network nodes generates spectral activity for detection by the joining node. The network node transmits a radio frequency activity burst of information at a defined frequency channel and in one or more defined spatial directions. This spectral activity is used by the joining node to identify active frequency channels and spatial sectors available for use during a join process. The burst of information may be much shorter than standard invitation packages since it is designed to identify activity only.

In one embodiment, if specific sectors do not exhibit any spectral activity over all searched frequency channels, they are assigned a low priority for any search for joining or simply skipped during subsequent searches. One reason for a lack of spectral activity on a sector might be the environment near the node. For example, one or more sectors of the node might be aligned with a blocking obstacle such as a wall, which prevents any line of sight communication with a remote radio or connectivity with another network node. Using the indication of spectral activity, the network can map the node's available potential for connectivity in those sectors. For future join process invitation transmissions, the network will avoid sending an invitation in the blocked directions.

A global positioning system (GPS) receiver can be used either integrally or externally to a node to identify the exact location of the node. Providing the location of an initial network node to the network allows the network to synchronize the locations of the nodes relative to each other and to new joining node. In the case where the first node position is provided to the network, the location of a newly installed node can be reported to the network by determining its location with a GPS device. The GPS receiver at the same location of the new node provides data indicating location of the new node. The data is communicated to the network and stored for subsequent use.

The network will identify the location of the new node and will instruct the nearby nodes to transmit invitation packets in the direction of the new location. As part of the join process, sectors of the joining node and network nodes are selected for best alignment providing best communication towards the joining node location. Once the join process is completed, the relative sectors which obtained best alignment are communicated to the network. The network can orient the node sectors with respect to each other and with respect to a map location. When the next node is installed and its coordinates are reported to the network, the network can identify the exact sectors of the already active nodes to be used to send invitations. This reduces the time and processing load for the invitation process.

If the position of the new node is not available to the network, the network will estimate the position after the first network-node establishes a connection using an approximate direction and range from the tuned sector and a ranging measurement. The ranging measurement is made by sending a data packet and measuring the response time until a return packet arrives, than calibrating for any internal delays.

In this manner, the network can map the relative angular alignment and range of the network nodes relative to the joining nodes. This information is used by the join process to tailor transmission of invitation packets to the joining node by nearby network nodes. This reduces the joining process by limiting searching by the network nodes to only the approximate direction of the joining node.

The join process described herein is also applicable for communication of invitations between network nodes that have multi beam scanning antennas and other nodes with single beam antennas. In this situation, the single beam node may be aligned mechanically in the direction of the other network node while it is receiving a signal on its single sector and scanning different frequencies for the invitation packets.

From the foregoing, it can be seen that the present embodiments provide an improved join process for adding a joining node to a wireless network in general and in particular to a wireless mesh network. Nodes of the network have steerable beam antennas and communicate to precisely and automatically align the joining node with other nearby nodes. Position information may be used to speed up the aligning process. The position information may be received by the network before the join process begins to initially locate the joining node. Also, the position information may be determined from the initial link between the joining node and a network node and thereafter used to complete links with other nearby nodes of the network.

While a particular embodiment of the present invention has been shown and described, modifications may be made. Accordingly, it is therefore intended in the appended claims to cover such changes and modifications which follow in the true spirit and scope of the invention.

What is claimed is:

1. A join process for a wireless mesh topology network where network nodes have multiple spatial coverage sub-sectors together covering a larger sector angle, where a node can establish connection with other nodes located in directions covered by its sub-sectors, the join process for adding a joining node to the network comprising:

a joining node starts listening to its sub-sectors at specific receiving frequencies for a defined time and thereafter changing its sub sectors and its receiving frequencies according to a defined timing and sequence; and, active network nodes transmitting organized invitation data packets on defined sectors, frequencies and timing, based on their relative location and possible connectivity to the joining node deduced from sub-sectors already used for existing internal network communication, thus reducing frequency interference and reducing time required for the join process.

2. The join process of claim 1 further comprising:
   one active network node distributing the schedule for the organized invitation data packets to other active network nodes.

3. The join process of claim 1 further comprising:
   an external computer distributing the schedule for the organized invitation data packets to the network nodes.

4. The join process of claim 1 further comprising:
   communicating using only a single sector which covers a single spatial sector from one active network node having a single spatial coverage sub-sector.

5. A method for adding a joining node to a wireless mesh network including one or more network nodes, the method comprising:

designating at least one network node for initiating communication with the joining node;

at the at least one network node, to initiate communication with the joining node, scanning on a first sector with highest probability of locating the joining node;

subsequently scanning on sectors of lower probability of locating the joining node; and receiving an answer at a network node in response to an invitation packet.

6. The method of claim 5 wherein subsequently scanning comprises:
   scanning on sectors immediately adjacent to the first sector; and
   subsequently scanning on sectors immediately adjacent to the sectors immediately adjacent to the first sector.

7. The method of claim 5 wherein subsequently scanning comprises:
   skipping scanning on sectors immediately adjacent sectors already scanned; and
   subsequently scanning on sectors immediately adjacent to the skipped sectors.

8. The method of claim 5 further comprising:
   receiving information about location of the joining node;
   based on the information about location of the joining node, identifying the first sector with highest probability of locating the joining node.

9. The method of claim 5 further comprising:
   receiving information about location of the joining node;
   based on the information about location of the joining node, identifying those network nodes with highest probability of locating the joining node; and
   assigning each identified network node to transmit in the direction of the location of the joining node.

10. The method of claim 5 further comprising:
    transmitting an invitation transmission from the at least one network node; and
    synchronizing at least one of time, direction and frequency of the invitation transmission by the at least one network node to avoid interference at the joining node.

11. A method for admitting one or more joining nodes wireless mesh network, the method comprising:
    scheduling transmission of data packets by inviting network nodes on defined frequency channels and at defined directions to create spectral activity for detection of the spectral activity by the one or more joining nodes; and
    at a joining node of the one or more joining nodes,
    scanning the defined frequency channels and different spatial directions to identify radio frequency activity of the inviting network nodes at the defined frequency channels,
    identifying spatial directions toward the inviting network nodes, and
    tuning to a defined frequency channel in the identified spatial direction to receive an invitation packet transmitted by the inviting network nodes between the data packets.

12. The method of claim 11 wherein transmission of data packets comprises:
    transmitting a radio frequency activity burst of information at a defined frequency channel and in one or more defined spatial directions.

13. The method of claim 11 wherein the data packets comprise short bursts of data, have a duration shorter than duration of the invitation packets and are transmitted more frequently than the invitation packets.

* * * * *